United States Patent [19]

Derman

[11] Patent Number: 5,010,748
[45] Date of Patent: Apr. 30, 1991

[54] STUD OR BOLT LOCKING DEVICE

[76] Inventor: Jay S. Derman, 4141 Dixie Canyon Ave., Los Angeles, Calif. 91423

[21] Appl. No.: 555,854

[22] Filed: Jul. 23, 1990

[51] Int. Cl.$^5$ ............................................. F16B 41/00
[52] U.S. Cl. ........................................ 70/164; 70/232; 70/DIG. 57
[58] Field of Search ................................. 70/229–232, 70/DIG. 57, 158, 163, 164, 166

[56] References Cited

U.S. PATENT DOCUMENTS

| | | | |
|---|---|---|---|
| 206,228 | 7/1878 | Connolly | 70/232 X |
| 1,704,910 | 3/1929 | Bradley | 70/230 |
| 1,912,872 | 6/1933 | Trautner et al. | 70/232 |
| 3,423,971 | 1/1969 | Brunelli | 70/232 |
| 3,696,646 | 10/1972 | Loscalzo | 70/232 X |
| 4,117,700 | 10/1978 | Saunders | 70/232 X |
| 4,284,300 | 8/1981 | Campbell | 70/231 X |
| 4,779,434 | 10/1988 | Derman | 70/232 X |
| 4,862,716 | 9/1989 | Derman | 70/232 X |

FOREIGN PATENT DOCUMENTS 1007922 2/1952 France .................................... 70/232
542273 1/1942 United Kingdom .................. 70/164

Primary Examiner—Lloyd A. Gall
Attorney, Agent, or Firm—Monty Koslover Assoc.

[57] ABSTRACT

A locking device for preventing access to a bolt or stud-nut which secures an equipment to a base. The device comprises three parts: a block, a cover member and a lock body. In use, the bolt is put through a hole in the block and the equipment and is tightened down. The cover member is then fitted over the head of the bolt or stud-nut and the lock body is inserted in the block and locked by a key. This causes the lock to bear down on the cover member, preventing its removal. The device is compact and able to be used for a variety of applications where equipments are secured by bolts or stud-nuts.

7 Claims, 1 Drawing Sheet

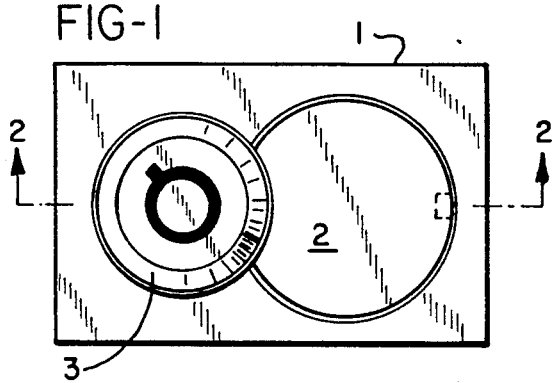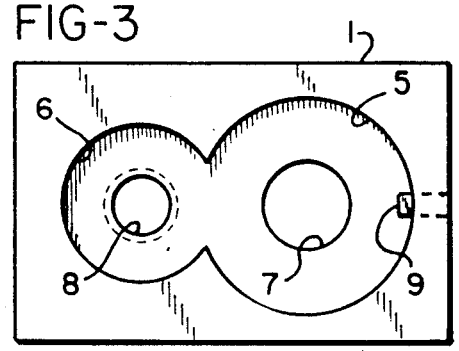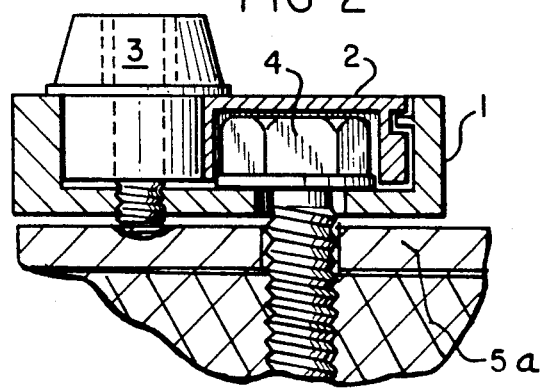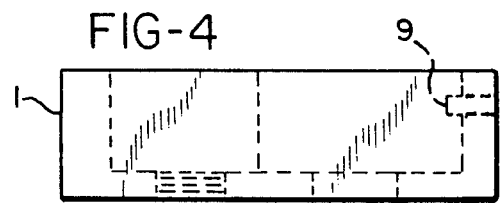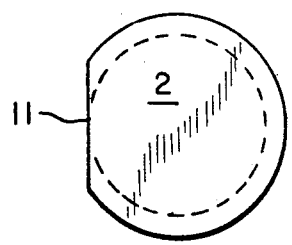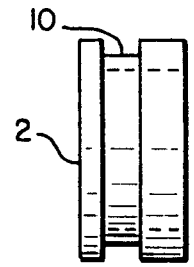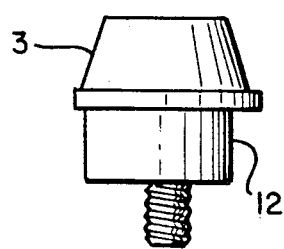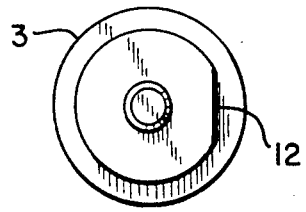

STUD OR BOLT LOCKING DEVICE

BACKGROUND OF THE INVENTION

Theft of bolted down equipment has become widespread, particularly in the case of automobile and truck equipment such as seats and spare tires, and office type equipment. To combat this theft, various locking devices are available. One of these devices is the Stud Nut Locking Device described in U.S. Pat. No. 4,862,716 by Jay S. Derman. This device is intended primarily for locking spare tires and utilizes a rectangular section tube and a locking assembly that is inserted in the tube until it grasps the wheel stud nut. A cylindrical plug lock, when locked in position, prevents the locking assembly from releasing the wheel stud nut and prevents access to it. The device does not cover the nut from view and is not easily adaptable for locking the heads of bolts or nuts such as are used to hold down seats or other equipment. An improvement to the device, to make it more universally adaptable to the needs of bolted down equipment such as automobile seats and office equipment, would make the device more useful in combatting theft.

SUMMARY OF THE INVENTION

The invention comprises three metal parts: a block, a cover member and a lock. The block is designed to be flat and smooth surfaced, with two recessed portions in it for seating the lock and the head of a bolt or stud. The fastening bolt is pushed through a hole in the block and tightened in place, with the bolt head in one recessed portion of the block. The cover member is then inserted in the recessed portion above the bolt head, covering it. Finally, the lock is inserted in the remaining recessed portion and locked in place by rotating a key. The lock covers of the top surface of the cover member preventing its removal and access to the bolt head.

Accordingly, it is a principal object of this invention to provide a device that will cover the head of a bolt or stud-nut, preventing access to it for unauthorized removal.

Another object is to provide a device that can be used for the locking against theft, of a range of automobile and office equipments. An advantage of the device is its simplicity and small size, enabling it to be used in tight quarters.

Further objects and advantages of the present invention will become apparent from the study of the following portion of the specification, the claims and the attached drawings.

BRIEF DESCRIPTION OF THE DRAWINGS

FIG. 1 is a plan view of the preferred embodiment of the present invention, showing it locked in place;

FIG. 2 is a side elevation cross-section view of the present invention locked in place, taken along line 2—2 of FIG. 1, particularly showing how the bolt head, locking the equipment to a base, is covered by the device;

FIG. 3 is a top plan view of the block, showing the two recessed portions for seating the lock and a bolt head or stud-nut;

FIG. 4 is a side elevation view of the block;

FIGS. 5A and 5B are respectively top and side elevation views of the cover member which is used to cover a bolt head or stud nut, particularly showing a flat in the disk circumference, a groove for locking, and its hollowed, cupshape interior; and FIGS. 6A and 6B are respectively side elevation and bottom views of the lock, particularly showing a flat surface ground in the body for use in abutting the cover member.

DESCRIPTION OF THE PREFERRED AND ALTERNATE EMBODIMENTS

Referring particularly to the drawings, there is shown in FIGS. 1 and 2 the preferred embodiment of the present invention. The invention comprises three parts: a block 1, a cover member 2 and a lock 3. When the cover member 2 is in place as shown in FIGS. 1 and 2, it can be used to cover the head of a bolt 4 which fastens an equipment 5a in place. Or a stud which projects through an equipment, and has a nut, may be similarly covered.

The lock 3 is locked in place by a key which causes a threaded member part of the lock 3 to engage a tapped hole in the block 1, securing the lock 3 in place. The lock 3 also covers part of the top of the cover member 2 and abuts it, preventing the cover member 2 removal. The threaded member of the lock 3 protrudes underneath the device and pushes into the equipment being secured, preventing the device from being rotated.

As shown, the device can be made to be small and compact, yet rugged, so that it may be used in areas with little space for locks. An example use, can be securing at least one bolt of a seat to an automobile to prevent theft. Another use, can be securing computer equipment which is bolted to a surface such as a floor or table.

Refer to FIGS. 3 and 4 which show plan and side views of the block 1, which is made of aluminum or similar material. The block is divided into two portions or areas, one for seating the lock 3, and the other for seating a bolt head 4 and providing space for the cover member 2. To accomplish this, a first circular depression 5 is recessed in the block 1 and sized wide enough and deep enough to provide clearance for the bolt head 4 and cover member 2. A second circular depression 6 is recessed in the block 1 so that it joins with and overlaps the first 5. This second depression is sized to accept and seat the lock 3.

A first hole 7 is cut in the center bottom surface of the first circular depression 5, and sized to allow clearance for a bolt or stud. Similarly, a second hole 8 is cut and tapped in the center bottom surface of the second circular depression 6 and sized to engage the threaded member of the lock 3.

A pin 9 is embedded in the upper wall of the first circular depression 5, and projects radially so that it may engage a groove which is cut in the cover member 2 and thereby retain it. This groove 10 is shown in FIG. 5B which, together with FIG. 5A shows top and side views of the cover member 2. The cover member 2 is cylindrically shaped, sized to fit in the first circular depression 5 in the block 1 and is hollowed out underneath, forming a cup-like surface for covering a bolt head or stud-nut. It is made of aluminum or an equivalent material. A flat edge 11 is made in one part of the cover circumference, the length of the flat edge corresponding approximately to the width of the space or chord joining the two circular depressions 5 and 6 which are recessed in the block 1. This flat edge 11 is provided to abut with a similar flat in the lock 3, described below. A groove 10 and pin 9 provide a fastening means for the cover member 2 to the block 1. By this means, the cover member 2 is rotatably fastened to the block.

Referring to FIGS. 6A and 6B, it is seen that the lock 3 has a threaded member and a flat 12 ground on one side of its body. This flat surface 12 abuts the flat edge 11 of the cover member 2 when all three parts of the device are assembled as in FIGS. 1 and 2, to cover a bolt head or nut in place. From the above description of the preferred embodiment of the invention, it is believed that the embodiment achieves the objects of the present invention. Some modifications of the embodiments described herein may be apparent to those skilled in the art. These modifications are considered to be within the spirit and scope of the present invention.

What is claimed is:

1. A locking device for bolts or studs comprising:
   a block, having portions adapted for seating a lock, and for seating the head of a bolt or a stud nut which is fastened to a stud;
   a cover member, sized and shaped to cover said block portion which seats the head of a bolt or stud nut; said cover member having a cylindrical shape with a flat edge formed on approximately one quarter of its circumference; said cover member having a cup-shaped recess formed in its bottom surface, large enough to accomodate the head of a bolt or stud nut; and
   a lock, sized and shaped to be seated in said block portion and having a threaded member for securing to said block, so that said lock will bear against the flat edge and part of the top of said cover member, preventing removal of said cover member and thereby preventing access to said head of bolt or stud nut.

2. A device as in claim 1 wherein
   said portions of said block comprise a first circular depression and a second circular depression which are recessed into its top surface, said first and second circular depressions being joined and opening into the other; said first circular depression being sized to accept and seat the head of a bolt or a stud nut with clearance for said cover member; said second circular depression being sized to accept a lock body; said first circular depression having a first hole cut in the center of its bottom surface and sized to allow clearance for a bolt or stud; said second circular depression having a second hole cut and tapped in the center of its bottom surface to engage the threaded member of said lock.

3. A device as in claim 1 wherein
   said cover member incorporates fastening means for rotatably securing itself to said block.

4. A device as in claim 3 wherein
   said fastening means include a groove cut in the circumference surface of said cover member, and a pin which is embedded in an upper wall of a first circular depression in said block; said pin projecting radially and acting to engage said groove in said cover member, thereby rotatably securing said cover member to said block.

5. A device as in claim 1 wherein
   said lock has a flat surface on one side of its tubular body, said flat surface for the purpose of abutting the flat edge of said cover member and engaging with it.

6. A device as in claim 1 wherein
   said block and said cover member are made from aluminum material, steel or high-impact plastic.

7. A device as in claim 1 wherein
   said threaded member of said lock extends beneath said block and protrudes into a surface of equipment being secured by the device, thereby preventing rotation of the device.

* * * * *